United States Patent
Chen

(10) Patent No.: US 8,369,823 B2
(45) Date of Patent: Feb. 5, 2013

(54) METHOD FOR LEGITIMATELY UNLOCKING A SIM CARD LOCK, UNLOCKING SERVER, AND UNLOCKING SYSTEM FOR A SIM CARD LOCK

(75) Inventor: Kuo-Yi Chen, New Taipei (TW)

(73) Assignee: Wistron Corporation, New Taipei (TW)

(*) Notice: Subject to any disclaimer, the term of this patent is extended or adjusted under 35 U.S.C. 154(b) by 189 days.

(21) Appl. No.: 13/024,505

(22) Filed: Feb. 10, 2011

(65) Prior Publication Data
US 2012/0058743 A1    Mar. 8, 2012

(30) Foreign Application Priority Data

Sep. 2, 2010 (TW) ................ 99129662 A

(51) Int. Cl.
H04M 11/04 (2006.01)
H04M 12/08 (2006.01)
(52) U.S. Cl. ................... 455/404.1; 455/411
(58) Field of Classification Search ........... 455/404.1, 455/411
See application file for complete search history.

(56) References Cited

U.S. PATENT DOCUMENTS

2007/0072641 A1    3/2007  Willey
2010/0273445 A1*  10/2010  Dunn et al. ............. 455/404.1
2012/0058743 A1*   3/2012  Chen ........................ 455/411

* cited by examiner

Primary Examiner — William D Cumming
(74) Attorney, Agent, or Firm — Nixon & Vanderhye P.C.

(57) ABSTRACT

A method for legitimately unlocking a SIM card lock, using an unlocking server connected to a USSD gateway, is for unlocking a SIM card lock set by a telecommunications service provider to a mobile terminal of a subscriber. Upon receiving an unlocking request that is transmitted from the mobile terminal and through the USSD gateway and that includes subscriber data and a USSD code representing activation of the unlocking request, the unlocking server requests the telecommunications service provider to verify, with reference to the subscriber data, whether the subscriber has a right to unlock the SIM card lock. Upon receiving verification from the telecommunications service provider that the subscriber has the right to unlock, the unlocking server transmits an unlocking program and an unlocking password to the mobile terminal such that the mobile terminal may execute the unlocking program and load the unlocking password for unlocking the SIM card lock.

13 Claims, 2 Drawing Sheets

METHOD FOR LEGITIMATELY UNLOCKING A SIM CARD LOCK, UNLOCKING SERVER, AND UNLOCKING SYSTEM FOR A SIM CARD LOCK

CROSS-REFERENCE TO RELATED APPLICATION

This application claims priority of Taiwanese Application No. 099129662, filed on Sep. 2, 2010.

BACKGROUND OF THE INVENTION

1. Field of the Invention

The present invention relates to a method for unlocking a subscriber identity module (SIM) card lock, more particularly to a method, which is implemented through unstructured supplementary system data (USSD) and over-the-air (OTA) mechanisms, for unlocking a SIM card lock.

2. Description of the Related Art

Contracts are usually made with telecommunications service providers when mobile terminals, such as mobile phones, are sold. Aside from storing phone number and contract content in a SIM card provided thereby, the telecommunications service providers require mobile terminal manufacturers to perform SIM card locking upon mobile terminals such that the mobile terminals are operable only when correct SIM cards are inserted thereinto. For example, a mobile terminal may be locked for only accepting a SIM card having a specific International Mobile Subscriber Identity (IMSI) code. An IMSI code is usually presented as a 15 digit code, and is composed of a Mobile Country Code (MCC), a Mobile Network Code (MNC), and a Mobile Station Identification Number (MSIN). The 3rd Generation Partnership Project (3GPP) stipulates five ways to execute SIM card locking.

A simple SIM card lock may be unlocked by a subscriber entering an unlocking password supplied by the mobile terminal manufacturer to the telecommunications service provider. However, for current advanced mobile terminals, they must be connected to a computer and use a specific program to load the unlocking password for unlocking.

The aforesaid SIM card lock mechanism constrains usage of mobile terminals. For example, when a user is in an area not supported by the contracted telecommunications service provider, the user may not use local telecommunications services by inserting a SIM card purchased locally into the mobile terminal.

Even when the contract has expired, the telecommunications service provider may not unlock the SIM card lock actively, since the telecommunications service provider always desires subscribers to continue using telecommunications services provided thereby. Moreover, even though the telecommunications service provider is capable of unlocking the SIM card lock, such as by adopting unlocking techniques disclosed in U.S. Pat. Nos. 6,321,079 and 7,689,204, the subscribers are generally not allowed to unlock a SIM card lock with relative ease. Therefore, a method for legitimately unlocking a SIM card lock which is acceptable to the telecommunications service providers and which facilitates unlocking of SIM card locks by the subscribers is being sought.

SUMMARY OF THE INVENTION

Therefore, an object of the present invention is to provide a method for legitimately unlocking a subscriber identity module (SIM) card lock that facilitates unlocking of a SIM card lock by a subscriber.

Accordingly, the method for legitimately unlocking the SIM card lock uses an unlocking server connected to an unstructured supplementary service data (USSD) gateway. The method is for unlocking the SIM card lock set by a telecommunications service provider to a mobile terminal of a subscriber. The method includes:

A) receiving an unlocking request that is transmitted from the mobile terminal and through the USSD gateway, the unlocking request including subscriber data and a USSD code representing activation of the unlocking request;

B) requesting the telecommunications service provider to verify, with reference to the subscriber data, whether the subscriber has a right to unlock the SIM card lock; and C) upon receiving verification from the telecommunications service provider that the subscriber has the right to unlock the SIM card lock, transmitting an unlocking program and an unlocking password to the mobile terminal such that the mobile terminal may execute the unlocking program and load the unlocking password for unlocking the SIM card lock.

Preferably, in step C), over-the-air (OTA) transmission is adopted during transmission. Moreover, the unlocking program and the unlocking password are transmitted to the mobile terminal by a short message service (SMS) center of the telecommunications service provider through OTA transmission.

Preferably, in step A), the subscriber data includes a phone number associated with the mobile terminal of the subscriber, and in step B), the telecommunications service provider is requested to verify whether the subscriber has the right to unlock the SIM card lock with reference to the phone number. Furthermore, in step C), an international mobile equipment identity (IMEI) code, that corresponds to the phone number and that is dedicated to the mobile terminal, is further transmitted to the mobile terminal, such that unlocking of the SIM card lock is possible only when the IMEI code transmitted to the mobile terminal conforms to the IMEI code recorded in the mobile terminal.

Another object of the present invention is to provide an unlocking server that cooperates with a telecommunications service provider to provide unlocking service for a subscriber identity module (SIM) card lock.

The unlocking server is to be connected to an unstructured supplementary service data (USSD) gateway for unlocking a SIM card lock set by the telecommunications service provider to a mobile terminal of a subscriber. The unlocking server includes a USSD data port, a telecommunications interface, and an unlocking control unit.

The USSD data port is to be connected to the USSD gateway for receiving an unlocking request transmitted from the mobile terminal and through the USSD gateway. The unlocking request includes subscriber data and a USSD code representing activation of the unlocking request.

The telecommunications interface is for connecting to the telecommunications service provider.

The unlocking control unit is for requesting the telecommunications service provider to verify, with reference to the subscriber data, whether the subscriber has a right to unlock the SIM card lock, and, upon receiving verification from the telecommunications service provider that the subscriber has the right to unlock the SIM card lock, for initiating transmission of an unlocking program and an unlocking password to the mobile terminal such that the mobile terminal may execute the unlocking program and load the unlocking password for unlocking the SIM card lock.

Preferably, the subscriber data included in the unlocking request received by the USSD data port includes a phone number associated with the mobile terminal of the subscriber.

The unlocking control unit requests the telecommunications service provider to verify whether the subscriber has the right to unlock the SIM card lock with reference to the phone number.

Preferably, the unlocking control unit further initiates transmission of an international mobile equipment identity (IMEI) code, that corresponds to the phone number and that is dedicated to the mobile terminal, to the mobile terminal such that unlocking of the SIM card lock is possible only when the IMEI code transmitted to the mobile terminal conforms to the IMEI code recorded in the mobile terminal.

Still another object of the present invention is to provide an unlocking system for a subscriber identity module (SIM) card lock. The unlocking system is for unlocking the SIM card lock of a mobile terminal of a subscriber, and includes a register, an unstructured supplementary service data (USSD) gateway and an unlocking server.

The register is for storing contract status of a phone number associated with the mobile terminal of the subscriber, an unlocking program corresponding to the SIM card lock, and an unlocking password.

The USSD gateway is for receiving a USSD code from the mobile terminal and for determining whether the USSD code represents activation of an unlocking request.

The unlocking server is connected to the register and the USSD gateway. The USSD gateway transmits the USSD code and data of the subscriber to the unlocking server when the USSD gateway determines that the USSD code represents activation of the unlocking request. The unlocking server searches the register to verify, with reference to the data of the subscriber, whether the subscriber has a right to unlock the SIM card lock, and initiates transmission of the unlocking program and the unlocking password to the mobile terminal upon verification that the subscriber has a right to unlock the SIM card lock, such that the mobile terminal may execute the unlocking program and load the unlocking password to unlock the SIM card lock.

Preferably, the unlocking system further includes an over-the-air (OTA) interface. The unlocking server initiates transmission of the unlocking program and the unlocking password to the mobile terminal through the OTA interface. More preferably, the OTA interface is a short message service (SMS) center.

Preferably, the data of the subscriber includes the phone number associated with the mobile terminal of the subscriber, and the unlocking server searches the register to verify whether the subscriber has the right to unlock the SIM card lock with reference to the phone number. Furthermore, the register further stores an international mobile equipment identity (IMEI) code, that corresponds to the phone number and that is dedicated to the mobile terminal. The unlocking server further initiates transmission of the IMEI code to the mobile terminal such that unlocking of the SIM card lock is possible only when the IMEI code transmitted to the mobile terminal conforms to the IMEI code recorded in the mobile terminal.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
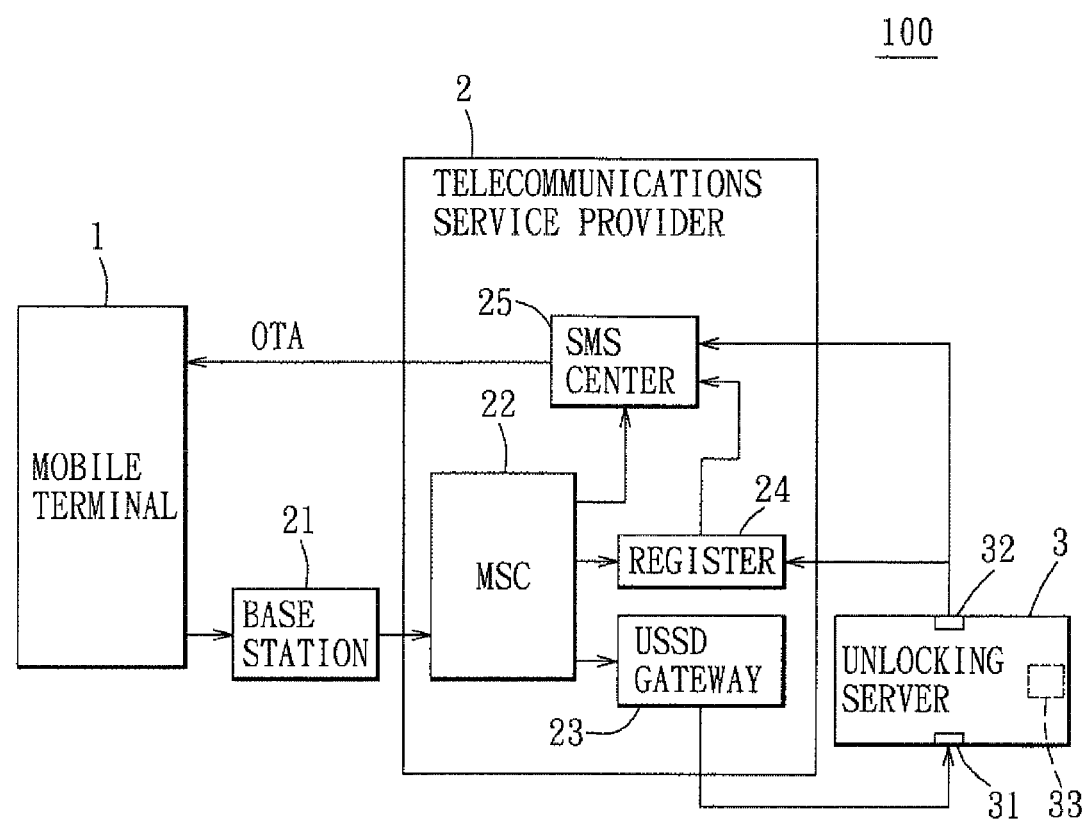
FIG. 1 is a block diagram illustrating hardware modules to implement a preferred embodiment of the method for legitimately unlocking a SIM card lock of the present invention.

Referring to FIG. 1, the unlocking system 100 of the present invention is for unlocking a SIM card lock of a mobile terminal 1, such as a mobile terminal, of a subscriber. Generally, the SIM card lock is set by a manufacturer of the mobile terminal 1 according to a demand made by a telecommunications service provider during the manufacturing process or after the subscriber has signed a contract with the telecommunications service provider 2. A preferred embodiment of the unlocking system 100 of the present invention primarily includes an unlocking server 3, an unstructured supplementary service data (USED) gateway 23 connected to the unlocking server 3, a register 24, and an over-the-air (OTA) interface.

In this embodiment, the register 24 refers to a Home Location Register (HLR) connected to a Mobile Switch Center (MSC) 22 of the telecommunications service provider 2. Each subscriber of the telecommunications service provider 2 has a dedicated HLR which records a phone number associated with the mobile terminal 1 of the subscriber, an International Mobile Equipment Identity (IMEI) code dedicated to the mobile terminal 1, an unlocking program and an unlocking password corresponding to the SIM card lock, and contract status of the phone number.

The OTA interface in this embodiment is a short message service (SMS) center 25, but is not limited to such. The OTA interface may also be one of WAP, GPRS, and CDMA1X service centers for performing remote management on SIM card data and application of the mobile terminal 1.

The USSD gateway 23 and the SMS center 25 are also connected to the MSC 22. When the subscriber uses the mobile terminal 1 to input a USSD code, a signal including the USSD code will be sent to the MSC 22 through a base station 21 and transmitted to the USSD gateway 23. Subsequently, the USSD gateway 23 determines what service item the USSD code represents prior to further transmission to a specific application server or gateway.

The unlocking server 3 includes a USSD data port 31 connected to the USSD gateway 23, a telecommunications interface 32 dedicatedly connected to the register 24 of the telecommunications service provider 2, and an unlocking control unit 33.

In the preferred embodiment of the unlocking system 100, the register 24, the SMS center 25 and the USSD gateway 23 are managed by the telecommunications service provider 2, and the unlocking server 3 is managed by an unlocking service provider. However, the present invention is not limited to the disclosure of this embodiment. For example, the phone number associated with the mobile terminal 1 of the subscriber, the IMEI code dedicated to the mobile terminal 1, the unlocking program, and the unlocking password may also be stored in a database (not shown) managed by the unlocking service provider.

Figure 2:
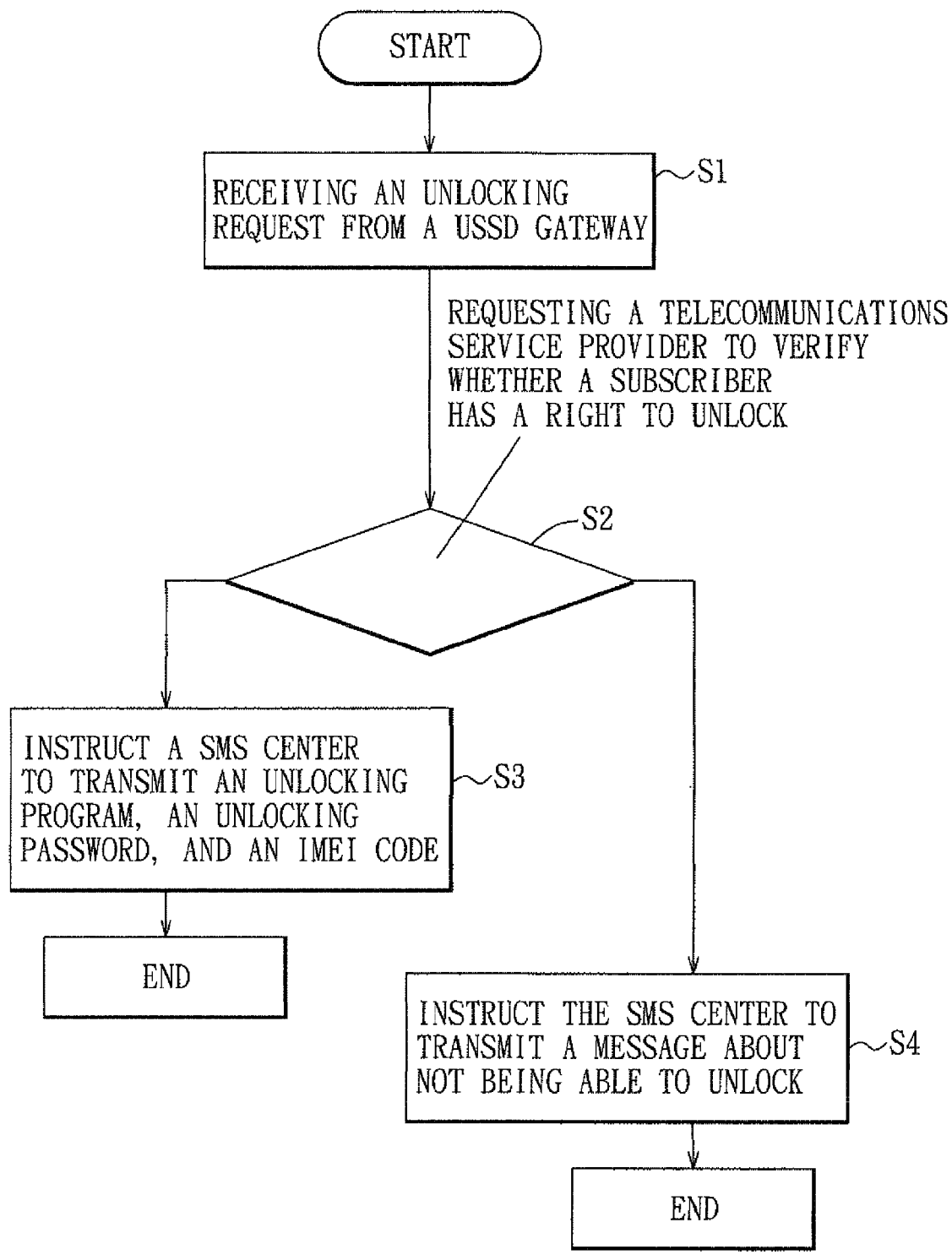
FIG. 2 is a flow chart illustrating steps of the method for legitimately unlocking a SIM card lock executed by an unlocking server of the preferred embodiment.

When the subscriber uses the mobile terminal 1 to input a predetermined USSD code specifically representing activation of an unlocking request, such as *422#, the signal including the USSD code will be sent to the MSC 22 through the base station 21 and transmitted to the USSD gateway 23. Subsequently, the USSD gateway 23 determines that the USSD code represents activation of the unlocking request, and therefore transmits the signal, referred as the unlocking request hereinafter, to the unlocking server 3. The unlocking server 3 performs the following steps as illustrated in FIG. 2.

In step (S1), the unlocking server 3 receives the unlocking request through the USSD data port 31. The unlocking request includes the USSD code and subscriber data. The subscriber data at least includes the phone number, and may further include the IMSI code that corresponds to the phone number and that is dedicated to the mobile terminal 1.

Subsequently, in step (S2), the unlocking control unit 33 of the unlocking server 3 requests the register 24 through the telecommunications interface 32 to verify, with reference to the subscriber data, whether the subscriber has a right to unlock the SIM card lock. Specifically, the telecommunications service provider 2 is requested to verify whether contract status of the phone number is one of expired, rescinded, or applied for contract suspension. If contract status between the phone number and the telecommunications service provider 2 is one of expired, rescinded, or applied for contract suspension, i.e., the subscriber having the right to unlock, step (S3) is to be performed. Otherwise, step (S4) is to be performed.

In step (S3), the unlocking control unit 33 accesses the unlocking program, the unlocking password and the IMEI code stored in the register 24, transmits the unlocking program, the unlocking password and the IMEI code to the SMS center 25, and instruct the SMS center 25 to forward the same to the mobile terminal 1 through OTA transmission, such that the mobile terminal 1 may execute the unlocking program, load the unlocking password, and compare the IMEI code transmitted to the mobile terminal 1 with the IMEI code recorded in the mobile terminal 1. Unlocking of the SIM card lock is possible only when the unlocking password matches the SIM card lock and the IMEI code transmitted to the mobile terminal conforms to the IMEI code recorded in the mobile terminal 1. In this step, the unlocking control unit 33 may also request the SMS center 25 to access the unlocking program, the unlocking password and the IMEI code stored in the register 24 and to transmit the same to the mobile terminal 1.

If the contract status of the phone number of the subscriber is not free, such as not expired, not rescinded, or not applied for contract suspension, the unlocking control unit 33 performs step (S4) to instruct the SMS center 25 to transmit a predetermined message about not being able to unlock the SIM card lock. For example, the message may clearly inform the subscriber when the contract will expire, or may inform the subscriber about not having the right to unlock.

In summary, through the aforementioned unlocking mechanism of the present invention, the subscriber of the mobile terminal 1 is capable of inputting the specific USSD code anywhere for activation of the unlocking request, and subsequently, the needed unlocking program and unlocking password are transmitted to the mobile terminal 1 through OTA transmission for unlocking the SIM card lock so as to reduce constraints on usage of the mobile terminal 1. On the other hand, the telecommunications service provider 2 only needs to provide data and cooperate in terms of connection such that labor cost and unlocking business management cost are reduced.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A method for legitimately unlocking a subscriber identity module (SIM) card lock using an unlocking server connected to an unstructured supplementary service data (USSD) gateway, the method being for unlocking a SIM card lock set by a telecommunications service provider to a mobile terminal of a subscriber, the method comprising:
   A) receiving an unlocking request that is transmitted from the mobile terminal and through the USSD gateway, the unlocking request including subscriber data and a USSD code representing activation of the unlocking request;
   B) requesting the telecommunications service provider to verify, with reference to the subscriber data, whether the subscriber has a right to unlock the SIM card lock; and
   C) upon receiving verification from the telecommunications service provider that the subscriber has the right to unlock the SIM card lock, transmitting an unlocking program and an unlocking password to the mobile terminal such that the mobile terminal may execute the unlocking program and load the unlocking password for unlocking the SIM card lock.

2. The method for legitimately unlocking a SIM card lock as claimed in claim 1, wherein over-the-air (OTA) transmission is adopted during transmission in step C).

3. The method for legitimately unlocking a SIM card lock as claimed in claim 1, wherein, in step C), the unlocking program and the unlocking password are transmitted to the mobile terminal by a short message service (SMS) center of the telecommunications service provider through over-the-air (OTA) transmission.

4. The method for legitimately unlocking a SIM card lock as claimed in claim 1, wherein, in step A), the subscriber data includes a phone number associated with the mobile terminal of the subscriber, and in step B), the telecommunications service provider is requested to verify whether the subscriber has the right to unlock the SIM card lock with reference to the phone number.

5. The method for legitimately unlocking a SIM card lock as claimed in claim 4, wherein, in step C), an international mobile equipment identity (IMEI) code, that corresponds to the phone number and that is dedicated to the mobile terminal, is further transmitted to the mobile terminal, such that unlocking of the SIM card lock is possible only when the IMEI code transmitted to the mobile terminal conforms to the IMEI code recorded in the mobile terminal.

6. An unlocking server to be connected to an unstructured supplementary service data (USSD) gateway for unlocking a subscriber identity module (SIM) card lock set by a telecommunications service provider to a mobile terminal of a subscriber, said unlocking server comprising:
   a USSD data port to be connected to the USSD gateway for receiving an unlocking request transmitted from the mobile terminal and through the USSD gateway, said unlocking request including subscriber data and a USSD code representing activation of said unlocking request;
   a telecommunications interface for connecting to the telecommunications service provider; and
   an unlocking control unit for requesting the telecommunications service provider to verify, with reference to the subscriber data, whether the subscriber has a right to unlock the SIM card lock, and, upon receiving verification from the telecommunications service provider that the subscriber has the right to unlock the SIM card lock, for initiating transmission of an unlocking program and an unlocking password to the mobile terminal such that the mobile terminal may execute said unlocking program and load said unlocking password for unlocking the SIM card lock.

7. The unlocking server as claimed in claim 6, wherein said subscriber data included in said unlocking request received by said USED data port includes a phone number associated with the mobile terminal of the subscriber, said unlocking control unit requesting the telecommunications service provider to verify whether the subscriber has the right to unlock the SIM card lock with reference to said phone number.

8. The unlocking server as claimed in claim 7, wherein said unlocking control unit further initiates transmission of an international mobile equipment identity (IMEI) code, that corresponds to said phone number and that is dedicated to the mobile terminal, to the mobile terminal such that unlocking of the SIM card lock is possible only when said IMEI code transmitted to the mobile terminal conforms to the IMEI code recorded in the mobile terminal.

9. An unlocking system for unlocking a subscriber identity module (SIM) card lock of a mobile terminal of a subscriber, said unlocking system comprising:
 a register for storing contract status of a phone number associated with the mobile terminal of the subscriber, an unlocking program and an unlocking password corresponding to the SIM card lock;
 an unstructured supplementary service data (USED) gateway for receiving a USSD code from the mobile terminal and for determining whether said USSD code represents activation of an unlocking request; and
 an unlocking server connected to said register and said USSD gateway;
 said USSD gateway transmitting said USSD code and data of the subscriber to said unlocking server when said USSD gateway determines that said USSD code represents activation of said unlocking request;
 said unlocking server searching said register to verify, with reference to the data of the subscriber, whether the subscriber has a right to unlock the SIM card lock, and initiating transmission of said unlocking program and said unlocking password to the mobile terminal upon verification that the subscriber has a right to unlock the SIM card lock, such that the mobile terminal may execute said unlocking program and load said unlocking password to unlock the SIM card lock.

10. The unlocking system as claimed in claim 9, further comprising an over-the-air (OTA) interface, said unlocking server initiating transmission of said unlocking program and said unlocking password to the mobile terminal through said OTA interface.

11. The unlocking system as claimed in claim 10, wherein said OTA interface is a short message service (SMS) center.

12. The unlocking system as claimed in claim 9, wherein the data of the subscriber includes the phone number associated with the mobile terminal of the subscriber, said unlocking server searching said register to verify whether the subscriber has the right to unlock the SIM card lock with reference to the phone number.

13. The unlocking system as claimed in claim 12, wherein said register further stores an international mobile equipment identity (IMEI) code, that corresponds to the phone number and that is dedicated to the mobile terminal, said unlocking server further initiating transmission of said IMEI code to the mobile terminal such that unlocking of the SIM card lock is possible only when said IMEI code transmitted to the mobile terminal conforms to the IMEI code recorded in the mobile terminal.

* * * * *